(12) United States Patent
Bezawada et al.

(10) Patent No.: US 12,288,853 B2
(45) Date of Patent: Apr. 29, 2025

(54) ENHANCED TEMPERATURE RANGE POWER SUPPLY

(71) Applicant: Honeywell International Inc., Charlotte, NC (US)

(72) Inventors: Murali Krishna Bezawada, Hyderabad (IN); Golakoti Ravi Kumar, Hyderabad (IN)

(73) Assignee: Honeywell International, Inc., Charlotte, NC (US)

( * ) Notice: Subject to any disclaimer, the term of this patent is extended or adjusted under 35 U.S.C. 154(b) by 0 days.

(21) Appl. No.: 18/506,295

(22) Filed: Nov. 10, 2023

(65) Prior Publication Data

US 2024/0079663 A1   Mar. 7, 2024

Related U.S. Application Data

(62) Division of application No. 17/192,100, filed on Mar. 4, 2021, now Pat. No. 11,855,263.

(Continued)

(51) Int. Cl.
*H01M 10/42* (2006.01)
*H01M 10/44* (2006.01)
*H02J 7/00* (2006.01)

(52) U.S. Cl.
CPC ....... *H01M 10/4257* (2013.01); *H01M 10/44* (2013.01); *H02J 7/0019* (2013.01);
(Continued)

(58) Field of Classification Search
CPC ......... H01M 10/4257; H01M 10/4264; H01M 10/4271; H01M 10/44; H01M 10/443;
(Continued)

(56) References Cited

U.S. PATENT DOCUMENTS 5,990,687 A   11/1999 Williams
7,321,313 B1   1/2008 Inlow
(Continued)

FOREIGN PATENT DOCUMENTS

| CN | 203376007 U | 1/2014 |
| CN | 106768189 A | 5/2017 |
| JP | 2014225942 A | 12/2014 |

OTHER PUBLICATIONS

SICK Sensor Intelligence, FLOWSIC600: Ultrasonic Gas Flow Meter—Operating Instructions, SICK Engineering GmbH, Jul. 2016 (138 Pages total).
(Continued)

*Primary Examiner* — Raymond Alejandro
(74) *Attorney, Agent, or Firm* — John Maldjian, Esq.; Stevens & Lee PC

(57) ABSTRACT

A communication device includes a battery, a communication module, a first charging circuit between the battery and the communication module, a fast charge signal, a second charging circuit between the battery and the communication module, and a control module configured to route power from the battery to the communication module via the second charging circuit in response to the fast charge signal being enabled and to route the power via the first charging circuit in response to the fast charge signal being disabled.

6 Claims, 6 Drawing Sheets

Related U.S. Application Data

(60) Provisional application No. 62/705,931, filed on Jul. 23, 2020.

(52) U.S. Cl.
CPC ... *H02J 7/0024* (2013.01); *H01M 2010/4271* (2013.01); *H01M 2010/4278* (2013.01)

(58) Field of Classification Search
CPC ... H01M 2010/4271; H01M 2010/4278; H02J 7/0019; H02J 7/0024
See application file for complete search history.

(56) References Cited

U.S. PATENT DOCUMENTS

| | | | |
|---|---|---|---|
| 2016/0286635 A1* | 9/2016 | Lestician | H05B 41/2827 |
| 2018/0111498 A1* | 4/2018 | Chen | H01M 10/44 |
| 2018/0152041 A1* | 5/2018 | Onishi | H02J 50/80 |

OTHER PUBLICATIONS

ABB, Intrinsically Safe Power Supply Unit—Instruction Manual, ABB Limted, Dec. 2004 (16 pages total).
Precision Digital, PD6600 Loop Leader Loop-Powered Intrinsically Safe & Nonincendive Process Meter, Retrieved from: https://www.predig.com/PD6606 Retrieved on: May 6, 2020 (6 pages total).

\* cited by examiner

ENHANCED TEMPERATURE RANGE POWER SUPPLY

CROSS-REFERENCE TO RELATED APPLICATION

This application is a divisional of U.S. application Ser. No. 17/192,100 filed Mar. 4, 2021, entitled, "ENHANCED TEMPERATURE RANGE POWER SUPPLY", which claims the benefit of U.S. Provisional Application Ser. No. 62/705,931 filed Jul. 23, 2020, entitled "ENHANCED TEMPERATURE RANGE POWER SUPPLY", which are incorporated herein by reference in their entirety.

BACKGROUND

Many devices are deployed in computer networks control systems that could present safety risks to people and the economy, if not controlled effectively. It is common for a utility company to operate a gas meter, for example, in a location near a gas line, with the potential for an explosion or a fire. Also, a gas meter is expected to operate for about 20 years without replacing the battery(ies). The gas meter is also expected to operate over a wide range of operating temperatures (e.g., −40 degrees Centigrade to +70 degrees Centigrade). This creates a challenging environment to operate in a safe and cost-effective manner.

Some utility companies use a service person to visually inspect the meter, which is labor intensive and cost ineffective. To minimize this time and cost, many meters are equipped with a communication mechanism to allow communication remotely to/from the meter to gather, for example status information, e.g., temperature, battery usage and remaining charge, and the like. A traditional computer network is one option, but it requires the operator of the network to purchase, deploy, and manage a large physical communication infrastructure. This type of infrastructure is outside the core capabilities of most utility companies and therefore, is undesirable.

Leveraging a cellular network, such as a category M1 or a narrow band network, significantly reduces the upfront cost associated with building a network. A cellular module's peak power consumption and duration for sending data from a meter to a head-end system, however, is much higher than that of a radio meant for walk-by or drive-by solutions. As mentioned, utility companies expect gas meters to operate for up to about 20 years without replacing the battery(ies). The meters must also operate under a wide operating temperature range (−40 degrees Centigrade to +70 degrees Centigrade) and in locations with a hazardous location safety rating.

Existing cellular based communication devices for use in hazardous locations operate down to about −20 degrees Centigrade. Typically, communication fails below −20 degrees Centigrade and at those temperatures, the battery life degrades to about 8 to 10 years with one D size battery. Thus, there is a need for an improved enhanced temperature range power supply and method.

SUMMARY

One implementation is for a communication device. The device includes a battery, a communication module, a first charging circuit between the battery and the communication module, the first charging circuit comprising a capacitor system between the battery and the communication module, a fast charge signal, a second charging circuit between the battery and the communication module, with at least one second resistor between the battery and the communication module, and a control module configured to route power from the battery to the communication module via the second charging circuit in response to the fast charge signal being enabled and to route the power via the first charging circuit in response to the fast charge signal being disabled.

Another implementation is for one or more hardware-based non-transitory memory devices storing computer-readable instructions which, when executed by the one or more processors disposed in a computing device, cause the computing device to determine a current operating temperature for a communication module, charge a capacitor through a first resistor, to supply power to the communication module if the current operating temperature is above a threshold, activate a fast-charge circuit if the current operating temperature is below a threshold, and charge a capacitor through a second resistor, to supply power to the communication module if the operating temperature is below the threshold, wherein the one or more hardware-based non-transitory memory devices further include routing the power from a battery to the communication module through an electric double layer capacitor connected in parallel to the capacitor and wherein the first resistor has a higher value than the second resistor.

In another implementation, a method for communication is described. The method comprises determining a current operating temperature for a communication module, charging a capacitor through a first resistor, to supply power to the communication module if the current operating temperature is above a threshold, activating a fast-charge circuit if the current operating temperature is below a threshold, and charging a capacitor through a second resistor, to supply power to the communication module if the operating temperature is below the threshold, wherein the method further includes routing the power from a battery to the communication module through an electric double layer capacitor connected in parallel to the capacitor.

DETAILED DESCRIPTION OF THE INVENTION

Figure 1:
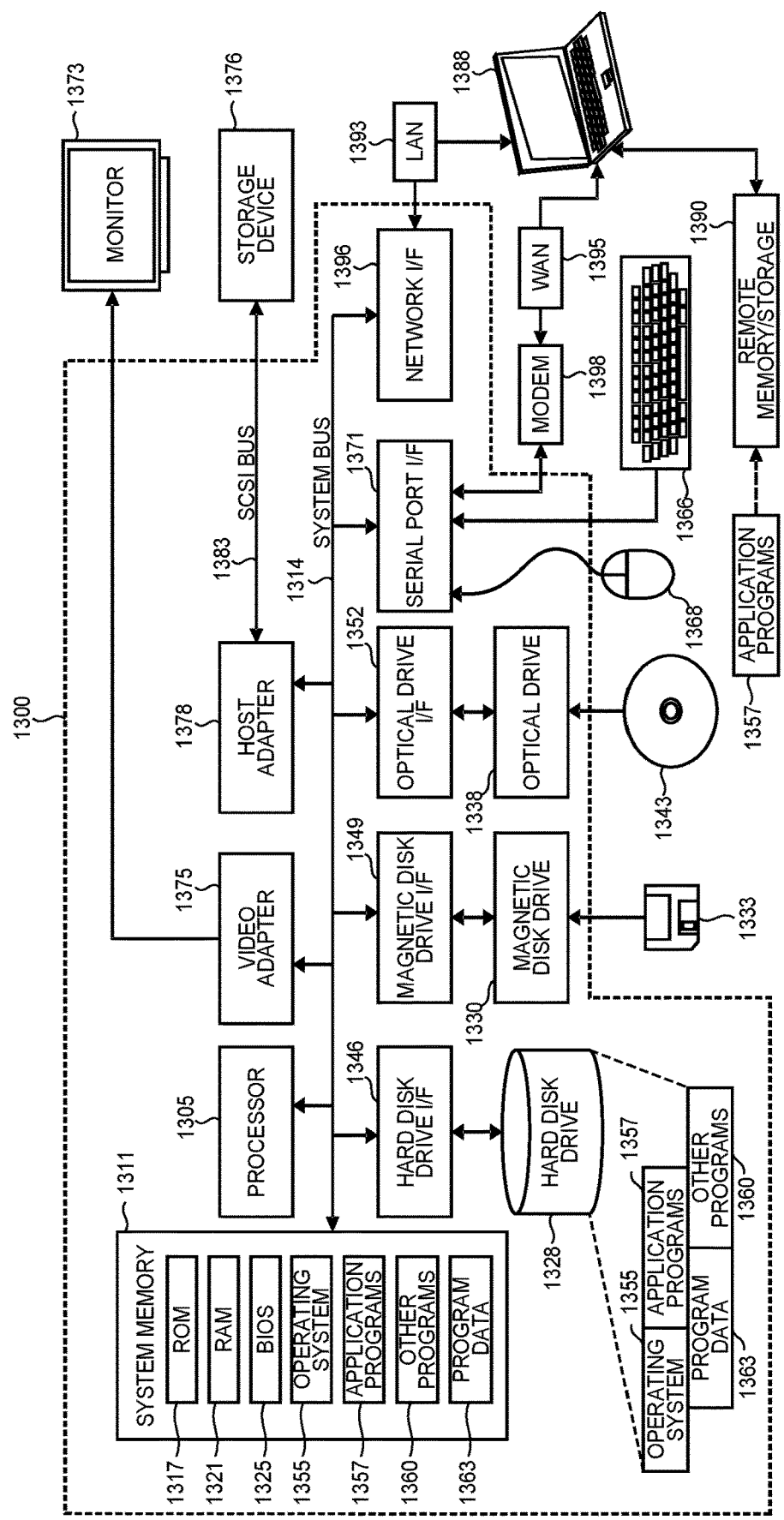
FIG. 1 is a simplified block diagram of a computer system which can be used to implement an enhanced temperature range power supply.

FIG. 1 is a simplified block diagram of a computer system which can be used to implement an enhanced temperature range power supply. In one example, the computer system 1300 includes a processor 1305, a system memory 1311, and a system bus 1314 that couples various system components including the system memory 1311 to the processor 1305. The system bus 1314 may be any of several types of bus structures, including a memory bus or memory controller, a peripheral bus, or a local bus using any of a variety of bus architectures. The system memory 1311 includes read only memory (ROM) 1317 and random-access memory (RAM) 1321. A basic input/output system (BIOS) 1325, containing the basic routines that help to transfer information between elements within the computer system 1300, such as during startup, is stored in ROM 1317. The computer system 1300 may further include a hard disk drive 1328 for reading from and writing to an internally disposed hard disk (not shown), a magnetic disk drive 1330 for reading from or writing to a removable magnetic disk 1333 (e.g., a floppy disk), and an optical disk drive 1338 for reading from or writing to a removable optical disk 1343 such as a CD (compact disc), DVD (digital versatile disc), or other optical media. The hard disk drive 1328, magnetic disk drive 1330, and optical disk drive 1338 are connected to the system bus 1314 by a hard disk drive interface 1346, a magnetic disk drive interface 1349, and an optical drive interface 1352, respectively. The drives and their associated computer-readable storage media provide non-volatile storage of computer-readable instructions, data structures, program modules, and other data for the computer system 1300.

Although this illustrative example includes a hard disk, a removable magnetic disk 1333, and a removable optical disk 1343, other types of computer-readable storage media, which can store data accessible by a computer such as magnetic cassettes, Flash memory cards, digital video disks, data cartridges, random access memories (RAMs), read only memories (ROMs), and the like, may also be used in some applications of the present use of an enhanced temperature range power supply.

In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and do not include waves, signals, and/or other transitory and/or intangible communication media.

A number of program modules may be stored on the hard disk, magnetic disk 1333, optical disk 1343, ROM 1317, or RAM 1321, including an operating system 1355, one or more application programs 1357, other program modules 1360, and program data 1363. A user may enter commands and information into the computer system 1300 through input devices such as a keyboard 1366 and pointing device 1368 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1305 through a serial port interface 1371 that is coupled to the system bus 1314, but may be connected by other interfaces, such as a parallel port, game port, or universal serial bus (USB). A monitor 1373 or other type of display device is also connected to the system bus 1314 via an interface, such as a video adapter 1375. In addition to the monitor 1373, personal computers typically include other peripheral output devices (not shown), such as speakers and printers. The illustrative example shown in FIG. 1 also includes a host adapter 1378, a Small Computer System Interface (SCSI) bus 1383, and an external storage device 1376 connected to the SCSI bus 1383.

The computer system 1300 is operable in a networked environment using logical connections to one or more remote computers, such as a remote computer 1388. The remote computer 1388 may be selected as another personal computer, a server, a router, a network PC, a peer device, or other common network node, and typically includes many or all of the elements described above relative to the computer system 1300, although only a single representative remote memory/storage device 1390 is shown in FIG. 1. The logical connections depicted in FIG. 1 include a local area network (LAN) 1393 and a wide area network (WAN) 1395. Such networking environments are often deployed, for example, in offices, enterprise-wide computer networks, intranets, and the Internet.

When used in a LAN networking environment, the computer system 1300 is connected to the local area network 1393 through a network interface or adapter 1396. When used in a WAN networking environment, the computer system 1300 typically includes a broadband modem 1398, network gateway, or other means for establishing communications over the wide area network 1395, such as the Internet. The broadband modem 1398, which may be internal or external, is connected to the system bus 1314 via a serial port interface 1371. In a networked environment, program modules related to the computer system 1300, or portions thereof, may be stored in the remote memory storage device 1390. It is noted the network connections shown in FIG. 1 are illustrative and other means of establishing a communications link between the computers may be used depending on the specific requirements of an application of the present use of an enhanced temperature range power supply.

Figure 2:
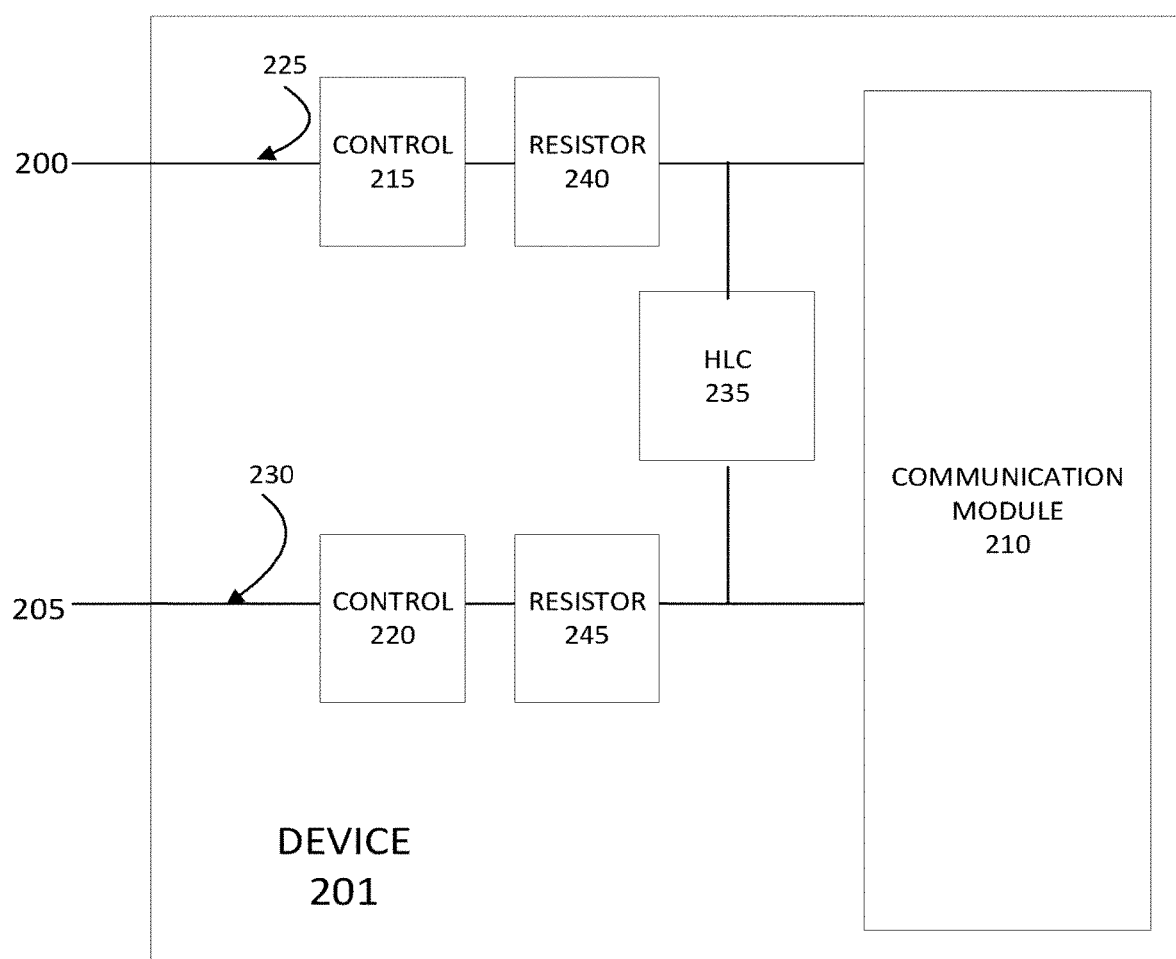
FIG. 2 is a simplified block diagram of a power supply that enables communication in a typical temperature range.

FIG. 2 is a simplified block diagram of a power supply that enables communication in a typical temperature range. FIG. 2 is described with respect to device 201. Device 201 includes first and second batteries 200 and 205, which supply power to a communication module 210. Communication module 210 is used for external communication from the device 201. It should be noted FIG. 2 is described with respect to two batteries, but any number of batteries can be used in device 201.

In operation, first and second control signals 215 and 220 are used to activate first and second switches 225 and 230, when the first and second switches 225 and 230 are open the batteries 200 and 205 will not charge the device 201. When the first and second control signals 215 and 220 are used to close the first and second switches 225 and 230, a capacitor 235, such as a hybrid layer capacitor (HLC)/lithium capacitor is charged through first and second resistors 240 and 245. In this example, first and second resistors 240 and 245 are 82-ohm resistors although other types of resistors can be used as well. One drawback of the device 201 is, at cold temperatures, the capacity of the capacitor 235 is drastically reduced, and it is further reduced when charged with the first and second resistors 240 and 245. In fact, in the case of a hybrid layer capacitor/lithium capacitor (or other lithium-based capacitor), the lithium can freeze and severely degrade the performance. This makes this solution not suitable for temperatures below −20 degrees Centigrade.

Figure 3:
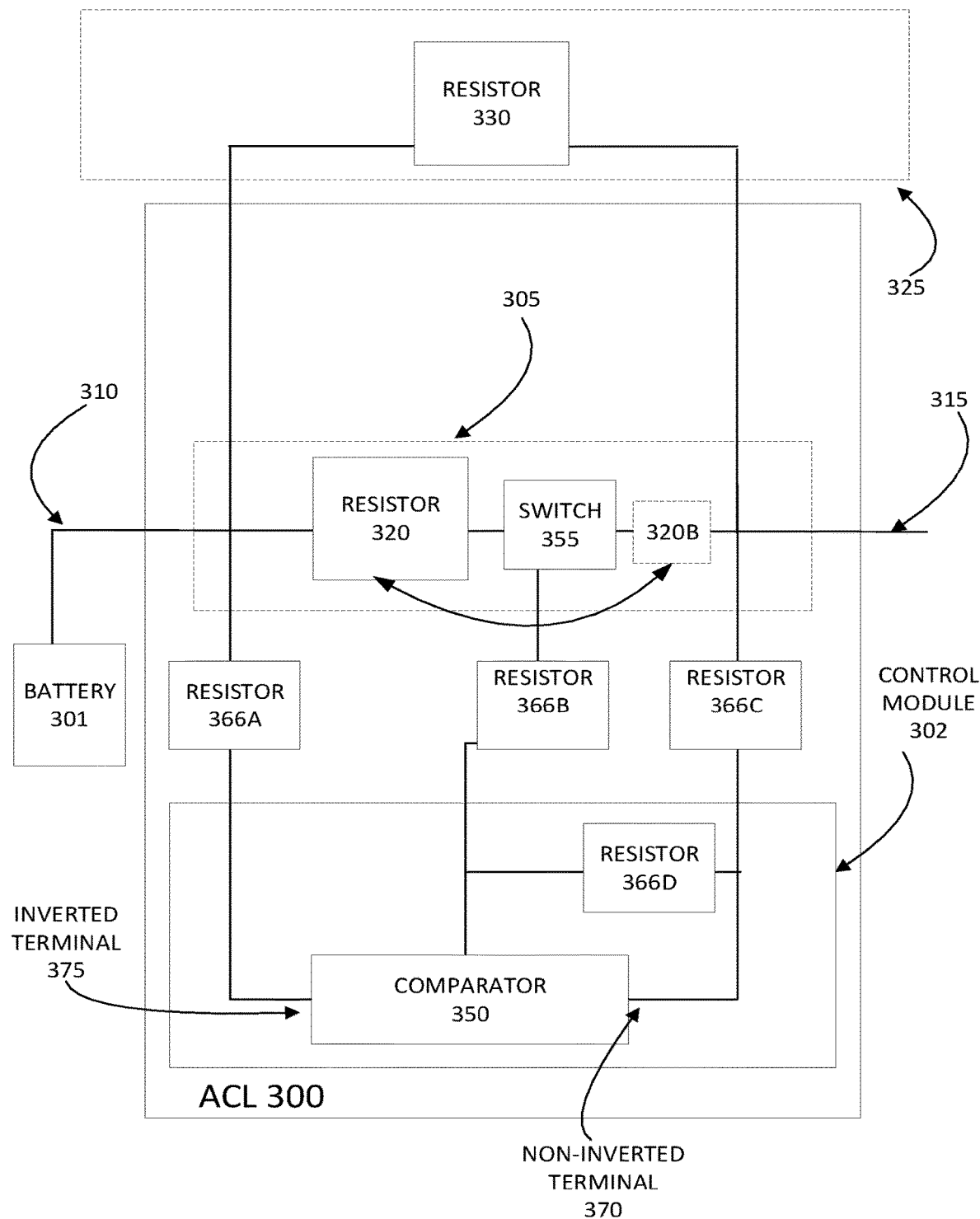
FIG. 3 is a simplified block diagram of an active current limit circuit for the enhanced temperature range power supply.

FIG. 3 is a simplified block diagram of an active current limit circuit for an enhanced temperature range power supply. The active current limit circuit 300 is capable of being charged by a battery 301. The active current limit circuit 300 has two distinct paths. In a first path 305, power travels from VDD IN 310 to VDD OUT 315 through resistor 320. In a second path 325, power travels from VDD IN 310 to VDD OUT 315 through resistor 330.

Therefore, the active current limit circuit 300 has the capability to enable fast charge or traditional charge capabilities depending on the path the active current limit circuit 300 enables. To that end, a control module 302 is used. The control module 302 enables at least two modes for fast and traditional charge capabilities. The control module 302 also enables a reverse current protection mode. The reverse current protection mode is configured to determine when current flow reverses. This could happen, for example, by a fault in the circuit. If a fault occurs, the reverse current protection mode can sense when current reverses and flows from VDD OUT 315 to VDD IN 310. This could cause a dangerous condition if the charge reverses into the battery specifically when the device is in the presence of a flammable substance such as gas. When current reverses, the reverse current protection mode disables the path between the battery 301 and the communication module. This will disable the circuit, but it protects it from a catastrophic event.

In operation, power is supplied from the battery 301 between VDD IN 310 and VDD OUT 315. The power can be routed by the control module 302 to VDD OUT 315 either via the first or second charging paths 305 and 325. A signal, such as a fast charge signal or other digital or analog signal can be supplied to the comparator 350 which can cause it to open or close a switch 355. In one example, opening the switch 355 opens the path through the resistor 320, and hence power is instead routed through the resistor 330. In one example, resistors 266A-D are also used by the control module to operate the switch 355 and for reverse current protection mode. In other examples, the resistor 320 can be in location 320B, (to the right of switch 355) and the circuit operates in the same manner.

In reverse current protection mode, a fault or other condition can cause the power to travel in the reverse direction from VDD OUT 315 to VDD IN 310 towards the battery 301. Specifically, resistor 330 is a relatively high value resistor, such as 82 ohms. Resistor 320, on the other hand is a lower value resistor. When the first charging path 305 carries current through the resistor 320, it is possible the resistor 320 is not strong enough to prevent a potential flow of current back to the battery 301. On the other hand, resistor 330 is typically strong enough to prevent current flowing backward. Therefore, in fast charging mode it is important to also implement reverse current protection mode, specifically in applications that comply with standards for devices with hazardous location ratings, or other safety standard.

In this case, the comparator 350 can sense this issue. For example, comparator 350 has a non-inverted terminal 370 and an inverted terminal 375. In one example, the comparator 350 can be an opamp, an opamp comparator, or the like. When current reverses, the non-inverted terminal 370 will have a larger voltage than the inverted terminal 375. This is contrary to the normal mode of operation, so logic in the comparator can be configured to open the switch 355 to disable the charging path 305.

Figure 4:
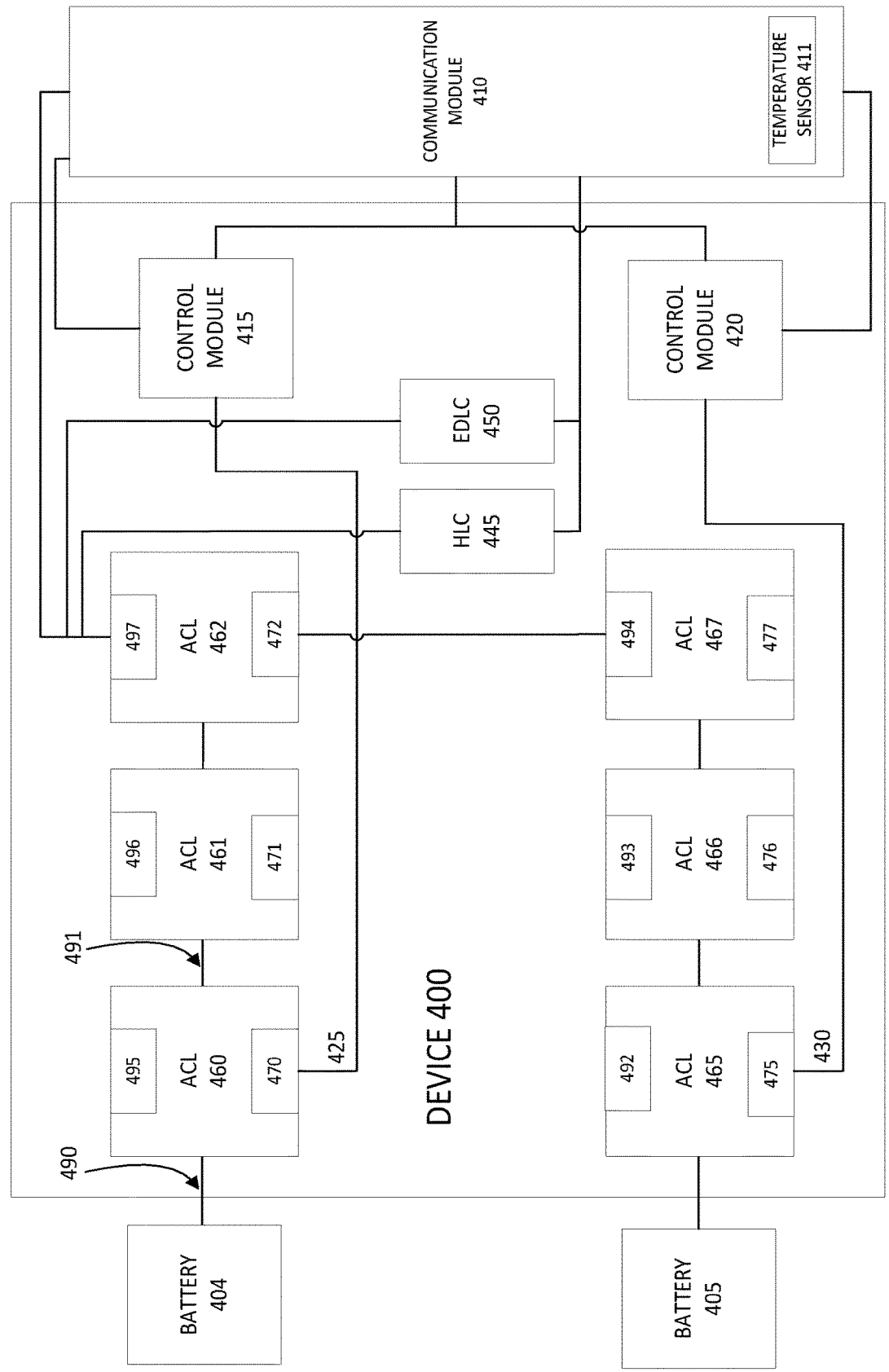
FIG. 4 is a simplified block diagram of the enhanced temperature range power supply.

FIG. 4 is a simplified block diagram of an enhanced temperature range power supply. FIG. 4 is described with respect to device 400. Device 400 includes first and second batteries 404 and 405, which supply power to a communication module 410. Communication module 410 is used for external communication from the device 400. It should be noted FIG. 4 is described with respect to two batteries, but any number of batteries can be used in device 400. In operation, first and second control signals are sent by control modules 415 and 420. The control signals are used to activate first and second switches 425 and 430, when the first and second switches 425 and 430 are open the batteries will not charge device 400. The control signals 420 and 425 are shown as having connections to active current limit circuits 460 and 465. The control signals 420 and 425, in other examples, can be connected in other ways, including directly connecting the signal to each of the active current limit circuits 460-462 and 465-467.

When the first and second control modules 415 and 420 are used to close the first and second switches 425 and 430, the device 400 can charge in either a normal mode or a fast charge mode. When a temperature sensor 411 indicates a temperature is above a temperature threshold, such as −20 degrees Centigrade, first and second fast charge signals 435 and 440 are disabled (normal mode). In normal mode, a capacitor 445 and an electric double layer capacitor 450 is charged in series through a high value resistor (not shown), such as an 82-ohm resistor. A variety of capacitors can be used. Some examples include, but are not limited to a lithium ion capacitor, a hybrid layer capacitor (HLC1550, HLC 1530, HLC 1520, or equivalent from Tadiran) or (SPC1550, SPC 1530, SPC 1520, or equivalent from Eve). The electric double layer capacitor also includes any equivalent supercapacitor or an ultracapacitor.

In the normal mode, active current limit circuits 460, 461, and 462 enable the power supplied from the first battery 404 to move through a first normal charging path (not shown). Similarly, active current limit circuits 465, 466, and 467 enable the power supplied from the second battery 405 to move through a second normal charging path (not shown). The path can be as described in active current limit circuit 300 FIG. 3 or in another manner. For example, the first and second normal charging paths can pass through circuitry in the active current limit circuits 460-467, wherein control circuitry enables a circuit analogous to the first charging path 325 through resistor 330 in active current limit circuit 300 of FIG. 3. In various examples, different resistors can be used in the first and second normal charging paths of active current limit circuits 460-467 so long as they are higher in value than resistors in first and second fast charging paths (not shown) of active current limit circuits 460-467.

When the temperature is below a temperature threshold, such as −20 degrees Centigrade (as indicated by the temperature sensor 411), the first and the second fast charge signals 425 and 430 are enabled. The temperature sensor 411 is shown as part of the communication module 410, although the temperature sensor 411 can be in any suitable location. In this mode, the capacitor 445 and the electric double layer capacitor 450 is charged in parallel through an active current limit circuit when the temperature sensor 411 indicates that the fast charge lines 425 and 430 should be enabled. When the active current limit circuit is enabled, the power supplied from the first battery 400 is routed through low value resistors 470, 471, and 472 in active current limit circuits 460, 461, and 462. Similarly, the power supplied from the second battery 405 is routed through low value resistors 475, 476, and 477 in active current limit circuits 465, 466, and 467. The low value resistors 470-472 and 475-477 are designed to offer a lower value of resistance as compared to the high value resistors in the active current limit circuits 460-467.

Reverse Current Protection Mode

Each of active current limit circuits 460-467 has a control module 492-497. One example of a control module is shown with respect to FIG. 3. Each of the control modules 492-497 in the active current limit circuits 460-467 has the capability to sense a difference in voltage between an input and an output of the active current limit circuit. This could occur, for example, where logic in active current limit circuit 460 senses current traveling from point 491 to point 490 towards the battery 404. If the voltage difference indicates that current is flowing in the reverse direction between points 491 and 490 (i.e., from the output to the input) one of the control modules 492-497 deactivates the active current limit circuit.

It should be noted that FIG. 4 shows a triplication of the active current limit circuits 460-462 connected to the battery 404. Likewise, FIG. 4 shows a triplication of the active current limit circuits 465-467 connected to the battery 405. This allows the device 400 to comply at least with any relevant standards for use in a hazardous location. Some of these relevant standards include, but are not limited to IEC 60079-11, IEC 60079-0, or any equivalent standard. It should be further noted that in the absence of the need to comply with a standard or in another situation (such as zones or divisions of hazardous locations), the device 400 could have a single active limit circuit connected to a battery, a single active limit circuit connected to each of a plurality of batteries, two active limit circuits connected to each of one or more batteries, and other configurations as well.

Figure 5:
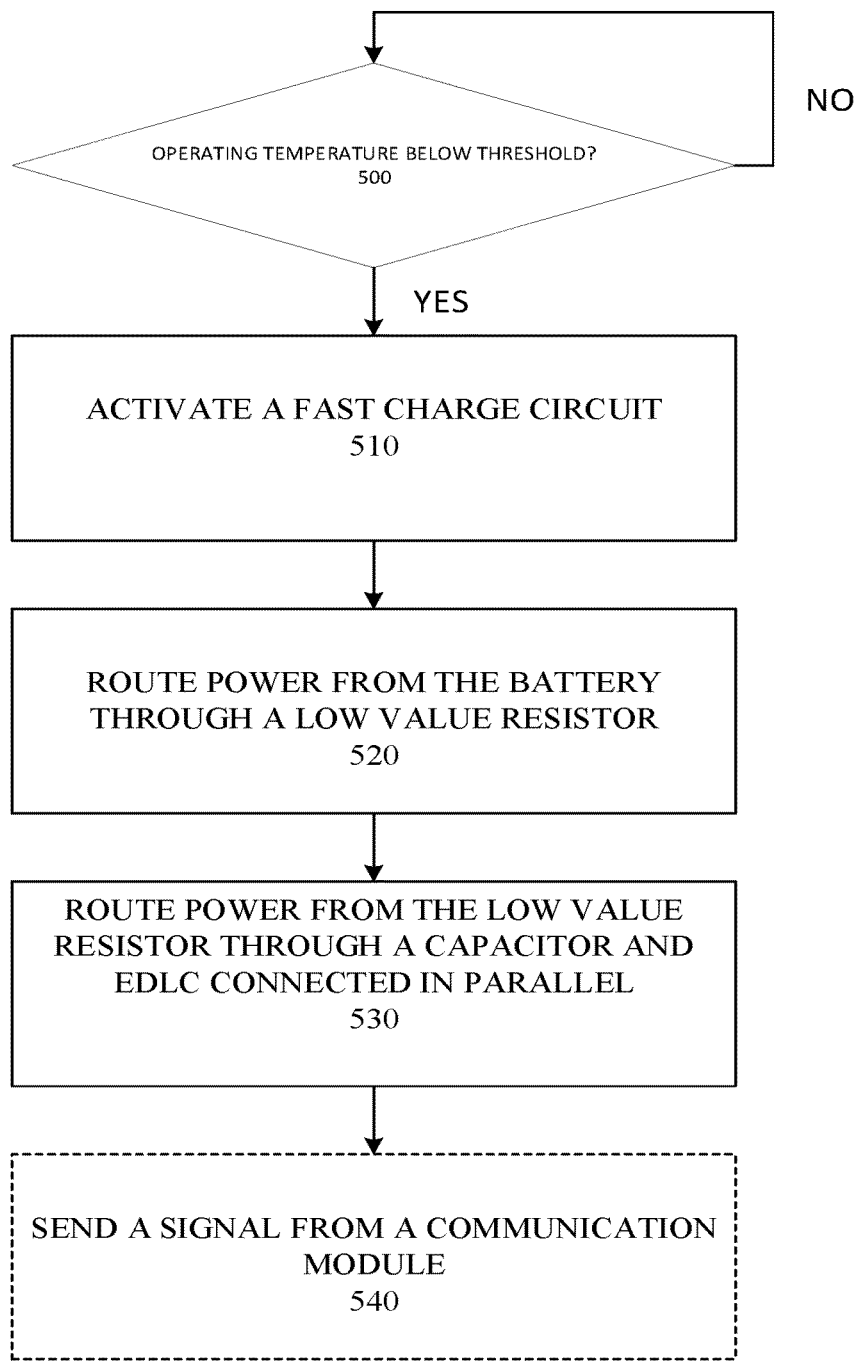
FIG. 5 is a flowchart that illustrates the present use of the enhanced temperature range power supply.

FIG. 5 is a flowchart that illustrates the present use of an enhanced temperature range power supply. At step 500, the system determines whether it is below an operating threshold. In one example, this is −20 degrees Centigrade, although any suitable threshold can be used. A temperature sensor is one example of a device that can perform this task. If the system is above the threshold, then step 500 repeats. During this time, the system may remain in a normal operation mode. In some examples, this includes charging a communication circuit in a normal mode suitable for the operating environment.

When the temperature drops below the threshold, a fast charging circuit is activated at step 510. This can be, for example, a circuit as described in FIG. 4 or another suitable circuit that differs from a circuit that operates at an operating temperature above the threshold. Thereafter, at step 520, power from a battery is routed through a low value resistor. The low value resistor may differ, for example, from a higher value resistor that is used in normal mode of operation, which can be 82-ohms. In one example, the low value resistor comprises one or more resistors that make up 4.7-ohms of resistance. At step 530, power is routed from the low value resistor through a capacitor and electric double layer capacitor connected in parallel. In one example, the capacitor is a hybrid layer/lithium capacitor/Lithium ion capacitor, although others can be used as well. At step 540, optionally, a signal is sent from a communication module, which can be supplied power from the aforementioned, fast-charge circuit. In this manner, the communication module sends a signal in an enhanced temperature range. Moreover, once the capacitor is fully charged, the fast charging circuit is deactivated.

Figure 6:
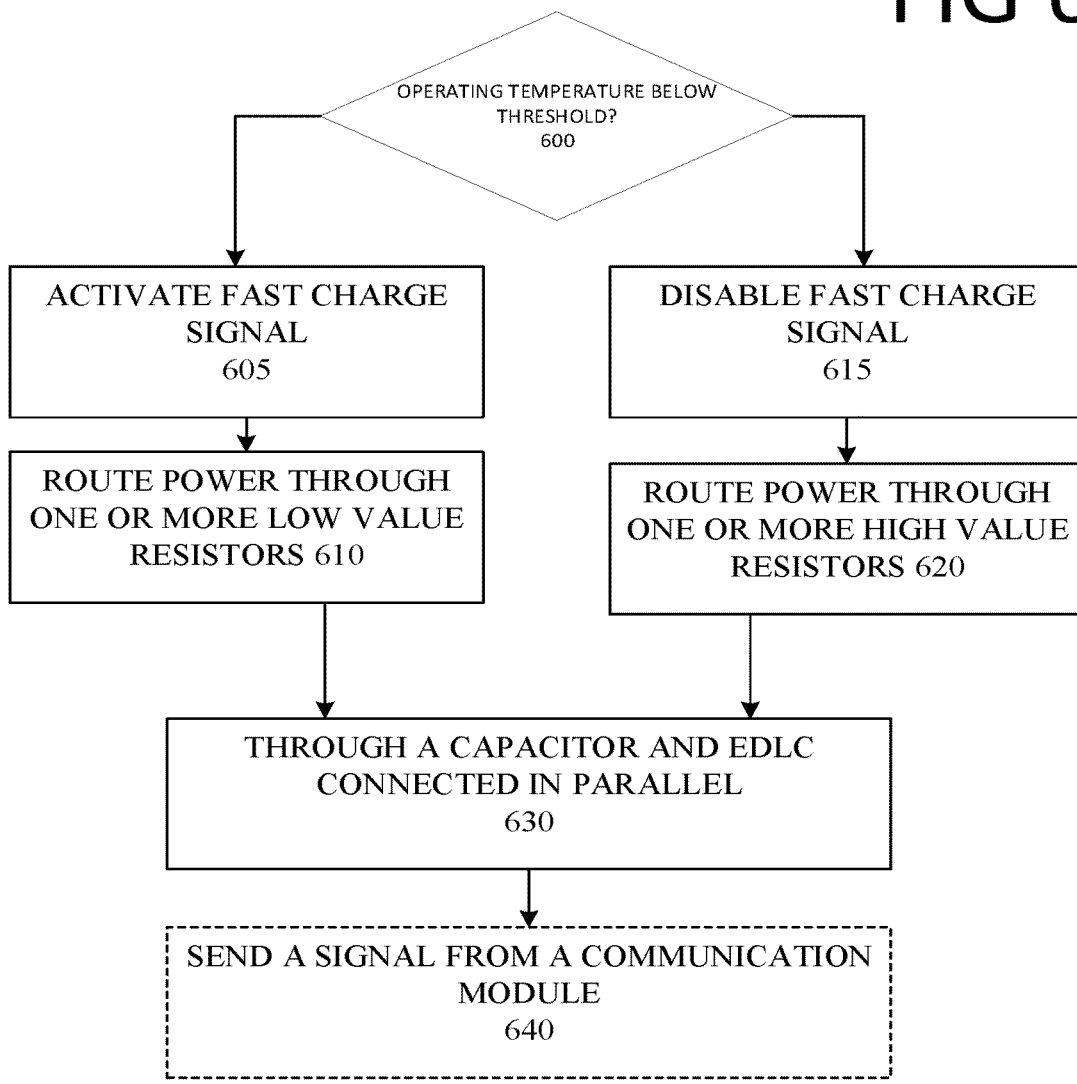
FIG. 6 is a flowchart that illustrates the present use of the enhanced temperature range power supply.

FIG. 6 is a flowchart that illustrates the present use of an enhanced temperature range power supply. At step 600, the system determines whether it is below an operating threshold. In one example, this is −20 degrees Centigrade, although any suitable threshold can be used. If the system is above the threshold, then at step 615 the fast charge signal is disabled (or alternatively if already disabled, it remains disabled). Alternatively, if the system is below the threshold at step 600, then at step 605 the fast charge signal is enabled (or alternatively is already enabled, it remains enabled). A temperature sensor can be used, in one implementation, to gather temperature data that is used to make the determination whether the system is above or below the threshold.

In the case where the fast charge signal is enabled, power is routed at step 610 through one or more low value resistors. In the case where the fast charge signal is disabled, power is routed at step 620 through one or more high value resistors. Different resistors can be used in various examples, so long as they have different capabilities and one is a higher value than the other. In one example, the high value resistors are 82-ohms and the low value resistors are 4.7-ohms. Thereafter, at step 630, power is routed through a capacitor and an electric double layer capacitor connected in parallel. In one example, the capacitor is a hybrid layer/lithium capacitor, although other types of capacitors can be used. Some examples include, but are not limited to a lithium ion capacitor, a hybrid layer capacitor (HLC1550, HLC 1530, HLC 1520, or equivalent from Tadiran) or (SPC1550, SPC 1530, SPC 1520, or equivalent from Eve). This enables routing of power to a communication module. The communication module is configured to send a signal from the device. Thus, at step 640 the device will optionally send a signal from the communication module.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A communication device:
   a battery;
   a communication module;
   a first charging circuit between the battery and the communication module, the first charging circuit comprising a capacitor system connected in series with a first resistor between the battery and the capacitor system;
   a fast charge signal;
   a second charging circuit between the battery and the communication module, the second charging circuit comprising the capacitor system connected in series with at least one second resistor between the battery and the capacitor; and
   a control module configured to route power from the battery to the communication module via the second charging circuit in response to the fast charge signal being enabled and to route the power via the first charging circuit in response to the fast charge signal being disabled.
2. The communication device of claim 1 wherein the capacitor system includes one or more of a hybrid layer/lithium ion capacitor and an electric double layer capacitor.
3. The communication device of claim 1 wherein the first resistor is a high value resistor.
4. The communication device of claim 1 wherein the at least one second resistor is a low value resistor.
5. The communication device of claim 1 wherein the control module includes one or more first active current limit circuits coupled to the second charging circuit.
6. The communication device of claim 5 wherein the one or more first active current limit circuits module are further configured to disconnect the second charging circuit when one of the first or the second active current limit circuits detects that a direction of the power has reversed.

* * * * *